(12) United States Patent
Steinmueller et al.

(10) Patent No.: US 9,192,216 B2
(45) Date of Patent: Nov. 24, 2015

(54) APPARATUS FOR SAFEKEEPING OF A HEADSET OR EAR BUD

(75) Inventors: Joerg Steinmueller, Meinerzhagen (DE); Guenter Kleindopp, Herscheid (DE); Martin Glomb, Schwelm (DE)

(73) Assignee: ATHOS Holding GmbH, Luedenscheid (DE)

( * ) Notice: Subject to any disclaimer, the term of this patent is extended or adjusted under 35 U.S.C. 154(b) by 215 days.

(21) Appl. No.: 13/818,335

(22) PCT Filed: Aug. 15, 2012

(86) PCT No.: PCT/EP2012/065973
§ 371 (c)(1),
(2), (4) Date: Jul. 11, 2013

(87) PCT Pub. No.: WO2014/026716
PCT Pub. Date: Feb. 20, 2014

(65) Prior Publication Data
US 2014/0048443 A1    Feb. 20, 2014

(51) Int. Cl.
*A45C 11/00* (2006.01)
*H04R 1/10* (2006.01)
*B65H 75/44* (2006.01)
*H02G 11/02* (2006.01)

(52) U.S. Cl.
CPC ............ *A45C 11/00* (2013.01); *B65H 75/4431* (2013.01); *H04R 1/1033* (2013.01); *B65H 2701/3919* (2013.01); *H02G 11/02* (2013.01)

(58) Field of Classification Search
CPC .................... B65H 75/4431; B65H 2701/3919

USPC ................ 242/378, 378.1–378.4; 191/12.4
See application file for complete search history.

(56) References Cited

U.S. PATENT DOCUMENTS

| 5,600,719 | A | | 2/1997 | Lovecky et al. | |
|---|---|---|---|---|---|
| 5,684,883 | A | * | 11/1997 | Chen | 381/385 |
| 5,832,098 | A | * | 11/1998 | Chen | 381/370 |
| 6,616,080 | B1 | * | 9/2003 | Edwards et al. | 242/378.1 |
| 8,967,518 | B2 | * | 3/2015 | Guo | 242/378 |

FOREIGN PATENT DOCUMENTS

| CH | 700 893 A2 | 10/2010 |
|---|---|---|
| DE | 195 23 178 A1 | 1/1996 |
| GB | 2469302 A | 10/2010 |
| JP | 61-065698 A | 4/1986 |
| WO | 00/68131 A1 | 11/2000 |
| WO | 01/43491 A1 | 6/2001 |
| WO | 03/043373 A1 | 5/2003 |

OTHER PUBLICATIONS

International Search Report of PCT/EP2012/065973, date of mailing Apr. 3, 2013.

* cited by examiner

*Primary Examiner* — Sang Kim
(74) *Attorney, Agent, or Firm* — Collard & Roe, P.C.

(57) ABSTRACT

The invention relates to an apparatus for safekeeping of a headset or ear bud, comprising a base plate (11) having an axle (14) molded on orthogonal to this plate, on which axle a winding spool (2) is mounted so as to rotate, wherein the winding spool (2) has two circular disks (22, 27) disposed parallel to one another, between which disks a winding space is formed, and wherein a recess (25) for passing through a mini-plug (71) is disposed in the upper disk (22), which is disposed on the side facing away from the base plate (11).

16 Claims, 11 Drawing Sheets

APPARATUS FOR SAFEKEEPING OF A HEADSET OR EAR BUD

CROSS REFERENCE TO RELATED APPLICATIONS

This application is the National Stage of PCT/EP2012/065973 filed on Aug. 15, 2012, the disclosure of which is incorporated by reference. The international application under PCT article 21(2) was not published in English.

The invention relates to an apparatus for safekeeping of a headset or ear bud.

Increasingly, so-called smartphones are being used as mobile telephones. These are small, portable computers with the additional functionality of a mobile telephone. Smartphones are regularly delivered with ear buds that often have an integrated microphone, so that they can be used as a headset. These ear buds are often used by the users both for telephoning and for listening to music or playing video games on the smartphone. For this purpose, the ear buds are generally carried along. In this connection, there is the increasing problem that the cable of the ear bud becomes tangled, often also with other string-like objects that are in the same pocket. Also, bending of the cable can take place, and this can result in cable breakage.

This is where the invention wishes to provide a remedy. The invention is based on the task of creating an apparatus for safekeeping of a headset or ear bud, which allows orderly and protected carrying of the headset or ear bud, and, at the same time, makes the headset or ear bud easily available when needed.

This task is accomplished by an apparatus according to the invention.

With the invention, an apparatus for safekeeping of a headset or ear bud is created, which allows orderly and protected carrying of a headset or ear bud, and, at the same time, makes the headset or ear bud easily available when needed. The provided cable can be wound up onto the winding spool, which is mounted so as to rotate, whereby the mini-plug of the headset or ear bud can be passed through the pass-through of the upper disk. The mini-plug is therefore located outside of the apparatus and can thereby be connected with the corresponding plug-in contact of the smartphone in uncomplicated manner.

In a further development of the invention, the axle has engagement projections on its free end, by means of which projections the winding spool is fixed in place axially on the axle. After the winding spool has been set onto the axle, it is automatically secured axially after having overcome the engagement projections.

In an embodiment of the invention, the base plate has an outer wall on the circumference, at least in certain regions, which wall has an outlet opening and encloses the circumference of the upper disk at least in certain regions. In this way, guidance of the cable to be wound up is created, whereby the winding space between the two disks of the winding spool as well as the outer wall of the base plate is delimited. The outlet opening allows introduction of the cable of a headset or ear bud into the apparatus, whereby the loudspeakers are disposed outside of the apparatus, thereby making them easy to reach. Such an arrangement furthermore allows an adjustment of the required length of the cable by means of pulling the cable out only in certain regions, at its loudspeaker-side end.

In a further embodiment of the invention, the lower disk, disposed facing the base plate, has a smaller outside diameter than the upper disk. In this way, the accommodation space formed between winding spool and circumferential outer edge of the base place is enlarged toward the outside, thereby making it possible to wind up a microphone that is present, integrated into the cable of an ear bud.

In a further embodiment of the invention, depressions and/or elevations are disposed on the upper disk, in its top side facing away from the lower disk, for manual rotation of the winding spool. In this way, winding up a headset or ear bud is facilitated.

Preferably, the upper disk has an accommodation for a mini-plug on its top side. In this way, orderly safekeeping of the mini-plug disposed on the end side, on the headset or ear bud, is made possible. It is advantageous if the accommodation is formed by two engagement arms disposed parallel to one another on the top side of the upper disk, between which arms the mini-plug can be fixed in place.

In a further embodiment of the invention, the upper disk has a circumferential crosspiece, which preferably describes a circular arc, into which an outlet opening for a cable is introduced, and which delimits an accommodation space for a mini-plug. In this way, a separate safekeeping space for the mini-plug of a headset or ear bud is formed.

In a further embodiment of the invention, the recess of the upper disk is formed by a slit that extends between two opposite locations of a circumferential crosspiece, and the width of which is dimensioned in such a manner that a mini-plug can be passed through it. In this way, passing the mini-plug of a headset or ear bud through for subsequently winding up the cable is facilitated. For this purpose, a guide for a mini-plug in the form of an indentation is preferably disposed below the slit, in the lower disk, parallel to the slit.

In a further embodiment of the invention, the pass-through of the upper disk is formed by a bore, whereby a recess that aligns with this bore is introduced into the lower disk, which recess aligns with a pass-through introduced into the base plate, in a position of the winding spool, in such a manner that in this position of the winding spool, a mini-plug can be introduced into the accommodation space, guided by the recesses, through the bore of the upper disk. In this way, threading the mini-plug of a headset or ear bud into the device, for subsequent winding up of the cable, is facilitated.

Preferably, the recess of the lower disk as well as the pass-through of the base plate is formed, in each instance, by a bore that corresponds to the recess of the upper disk, proceeding from which a slit is passed all the way to the outer edge of the lower disk or of the base plate, respectively. In this way, passing the mini-plug through, while simultaneously threading the cable into the winding spool, is made possible.

In a further development of the invention, the accommodation space delimited by the crosspiece is covered by a releasably attached lid. In this way, an accommodation space for the mini-plug of a headset or ear bud to be accommodated, which space can be closed off, is formed. Advantageously, this lid can be provided with depressions and/or elevations on its top side, which is directed outward, for manual rotation of the winding spool.

In a further development of the invention, two crosspieces are formed onto the lid, on its side facing the engagement arms, parallel to one another, which crosspieces lie against the engagement arms on the outside, thereby forming an outlet for a mini-plug. In this way, good guidance for the mini-plug is achieved.

In a further embodiment of the invention, the lower disk has an accommodation for a spring, preferably a helical spring, on its side facing the base plate, whereby a locking lever is disposed on the base plate, by way of which the winding spool can be fixed in place, counter to the spring force, in various positions of rotation. In this way, automatic winding up of the cable of a headset or ear bud is brought about. Preferably, engagement notches are formed into the circumference of the lower disk, which notches interact with the locking lever and by way of which notches the winding spool can be fixed in place.

In a further embodiment of the invention, the base plate is connected with the back wall of a smartphone or with the back wall of a protective cover for a smartphone. In this way, an integrated safekeeping possibility for a headset or ear bud is created. In this connection, the base plate can preferably be formed onto the smartphone or the protective cover of a smartphone, in such a manner that it simultaneously forms at least a part of the back wall of the smartphone or of the protective cover. Alternatively, the base plate can also be releasably connected with the smartphone or the protective cover. The connection of the apparatus with a protective cover for a smartphone brings with it the advantage that an apparatus can be used for multiple smartphones that can be accommodated by the protective cover.

In an embodiment of the invention, the base plate has engagement means that are releasably engaged into engagement means disposed on the smartphone or on the protective cover. In this way, simple mounting on the smartphone or on a protective cover that accommodates a smartphone is made possible.

In another embodiment of the invention, at least one wing is formed onto the base plate, which wing can be pushed into an accommodation disposed on the back wall of the smartphone or of the protective cover. In this way, too, outfitting a smartphone or a protective cover that accommodates a smartphone with the apparatus, as needed, is made possible. Advantageously, four wings offset from one another by 90°, in each instance, are provided, supplementing the base plate to create a square surface area. In this way, attaching the apparatus to the smartphone or to the protective cover that accommodates a smartphone, in four positions rotated by 90°, in each instance, is made possible, thereby making an optimal orientation of the mini-plug accommodated by the apparatus possible.

Other further developments and embodiments of the invention are indicated below. An exemplary embodiment of the invention is shown in the drawings and will be described in detail below. The drawings show.

Figure 1:
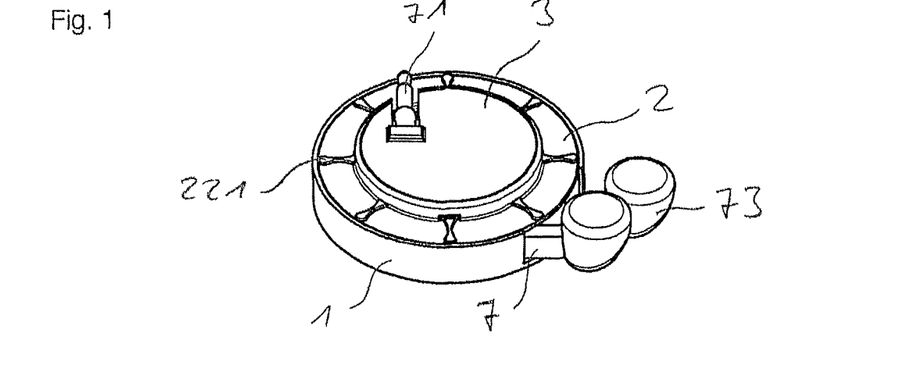
FIG. 1 the schematic, spatial representation of a safekeeping apparatus for an ear bud for a smartphone.
Figure 2:
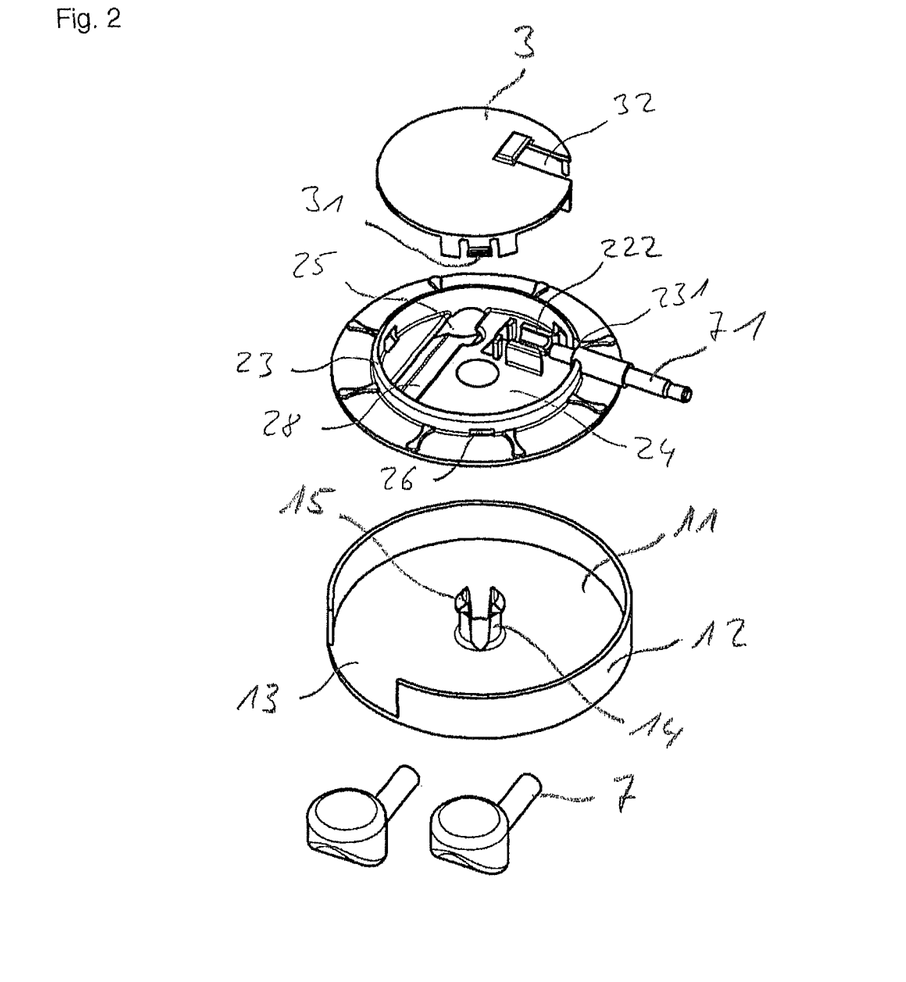
FIG. 2 the representation of the safekeeping apparatus from FIG. 1 in an exploded representation, with the ear bud indicated.
Figure 3:
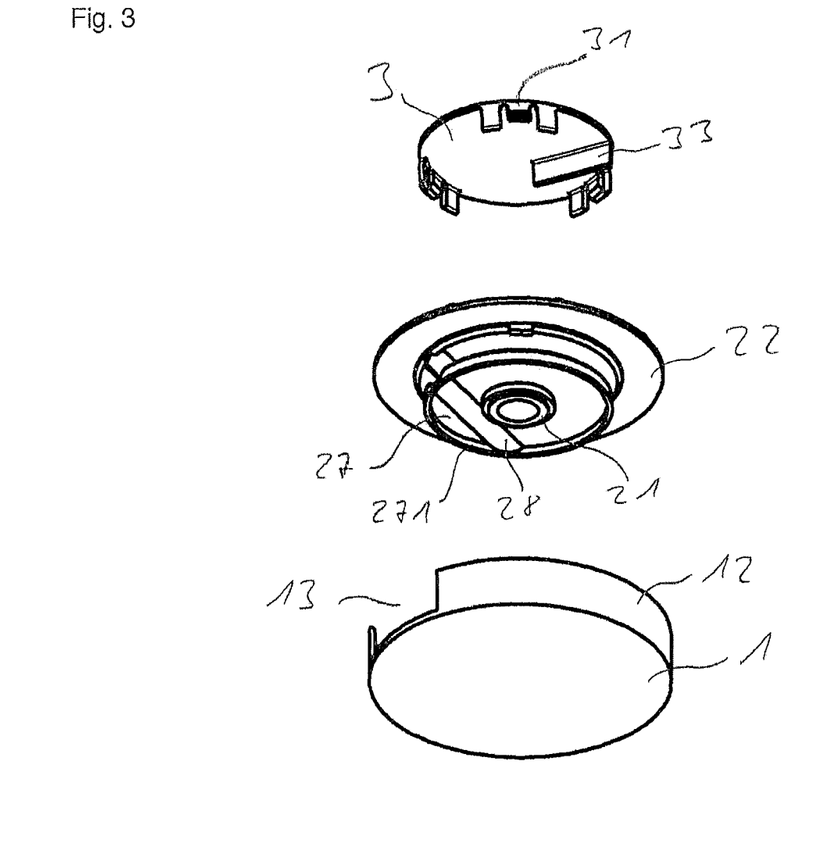
FIG. 3 the representation of the safekeeping apparatus from FIG. 1 in a further exploded representation.

The apparatus for safekeeping of an ear bud for a smartphone that was selected as an exemplary embodiment essentially consists of a beaker-shaped base body 1, which accommodates a winding spool 2 that has an accommodation space 24 for a plug 71, which space is closed off by way of a lid 3.

In the exemplary embodiment, the base body 1 is produced as an injection-molded plastic part. It essentially consists of a base plate 11 in the shape of a circular disk, onto which an outer wall 12, in the shape of a circular arc, disposed orthogonal to the base plate 11, is formed on, which wall has an outlet opening 13 on one side. An axle 14 is formed onto the center of the base plate 11, orthogonal to the latter. The axle 14 is formed in the shape of a slit cylinder that has an engagement projection 15 on both sides of the slit.

The winding spool 2 is also produced as an injection-molded plastic part. It consists essentially of two disks 22, 27 disposed parallel to one another, which are connected at a distance from one another, by way of an axle accommodation 21 configured as a hollow cylinder that passes centrally through the disks. The lower disk 27, which faces the base plate 11 of the base body 1, has a smaller diameter, in the exemplary embodiment, than the opposite upper disk 22. On the upper disk 22, a crosspiece 23 in the shape of a circular arc is formed on, concentric to the axle accommodation 21, between the ends of which crosspiece an outlet opening 231 is formed. On the circumference, the crosspiece 23 is provided with engagement openings 26 for accommodation of the engagement arms 31 of the lid 3. At a distance from the axle accommodation 21, a slit-shaped recess 25 is introduced into the upper disk 22, which recess extends between two opposite locations of the circumferential crosspiece 23, and the width of which is dimensioned in such a manner that a mini-plug 71 can be passed through longitudinally.

Within the circumferential crosspiece 23, two engagement arms 222 disposed parallel to one another are furthermore formed onto the upper disk 22, for clamping fixation of a mini-plug 71. Outside of the accommodation space 24 delimited by the circumferential crosspiece 23, elevations 221 are formed onto the upper disk 22, on the circumference, spaced apart from one another. The elevations 221 serve for better handling of the winding spool 2 when winding up a cable of an ear bud 7.

Below the slit-shaped recess 25 of the upper disk 22, an indentation 28 that runs along the lower disk 27, analogously, is formed into the lower disk 27. The indentation 28 serves for guidance of a mini-plug 71 when it is passed through the recess 25 of the upper disk 22. An edge 271 is formed onto the lower disk 27, on its circumference, on its side facing the base plate 11.

The lid 3 is configured in the form of a circular plastic disk. On the circumference of the lid 3, engagement arms 31 for engagement into the engagement openings 26 of the crosspiece 23 are formed on, orthogonal to the disk, in the direction of the winding spool 2. Furthermore, an essentially rectangular recess 32 is introduced into the lid 3, the two long sides of which recess are provided with crosspieces 33 formed onto the underside of the lid 3, facing the base body 1. The crosspieces 33 are disposed on the lid 3 in such a manner that in the assembled state of the lid 3, they lie against the engagement arms 222 of the winding spool 2 on the outside, thereby additionally fixing in place a mini-plug 71 that is clamped in there.

For safekeeping of an ear bud 7 in the apparatus described above, first the winding spool 2 is turned in such a manner that the indentation 28 of the lower disk 27 aligns with the outlet opening 13 of the base body 1. Subsequently, the mini-plug 71 of the ear bud 7 is pushed in, along the indentation 28, and passed through the slit-shaped recess 25 of the upper disk 22, and subsequently clamped in between the engagement arms 222.

Subsequently, the lid 3 is attached to the winding spool 2, whereby its engagement arms 31 engage into the engagement openings 26 of the crosspiece 23 of the winding spool 2. In this connection, the crosspieces 33 of the lid 3 lie against the engagement arms 222 on the outside. Subsequently, the cable of the ear bud 7 is wound onto the winding spool 2 by means of rotation of the winding spool 2 about the axle 14 of the base body 1, until the loudspeakers 73 of the ear bud 7 lie against the outlet opening 13 of the base body 1. For use of the ear bud, the cable is unwound from the winding spool 2, to the desired length, and subsequently the mini-plug 71 is pulled out and connected with the smartphone.

Figure 4:
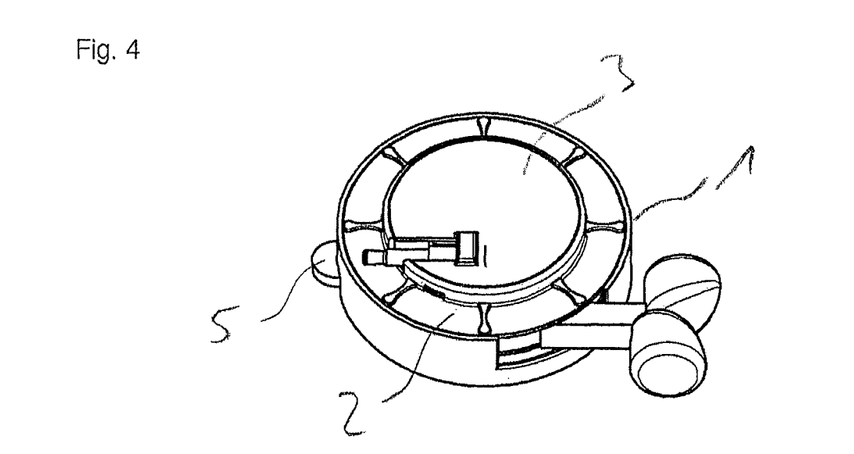
FIG. 4 the schematic, spatial representation of a safekeeping apparatus for an ear bud for a smartphone in a further embodiment.
Figure 5:
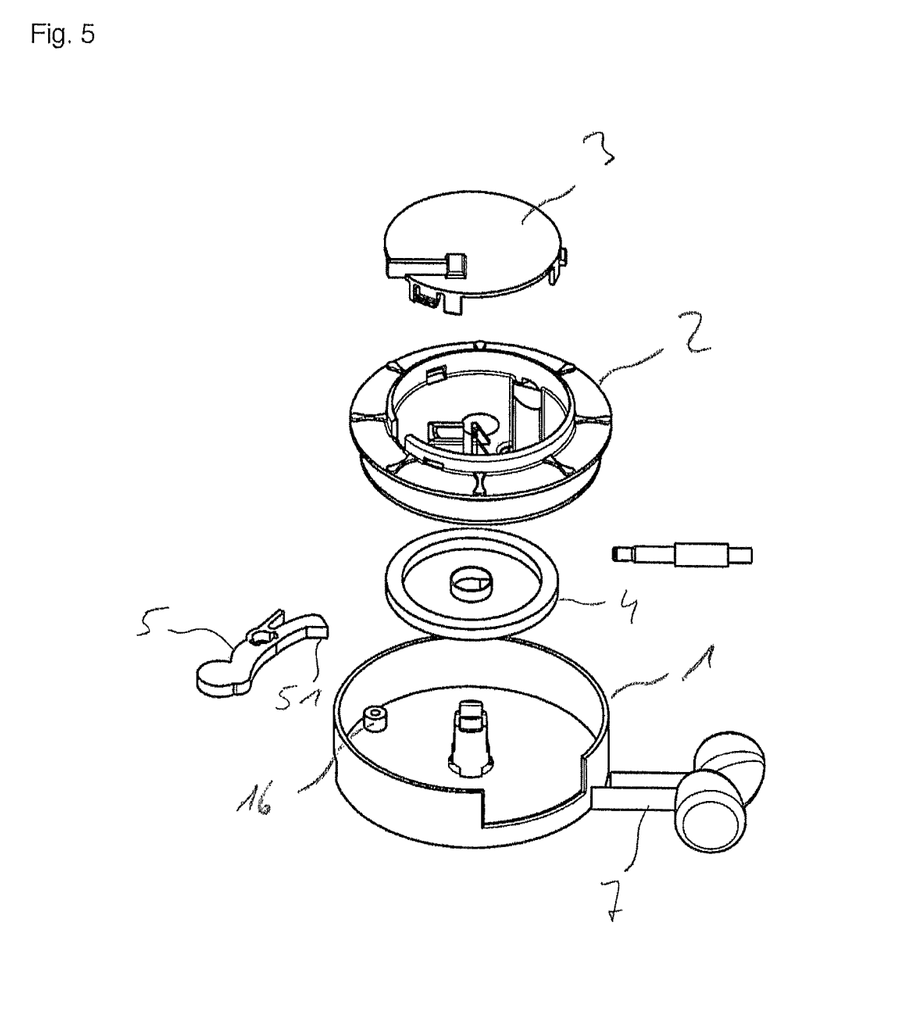
FIG. 5 the representation of the safekeeping apparatus from FIG. 4 in an exploded representation, with the ear bud indicated.
Figure 6:
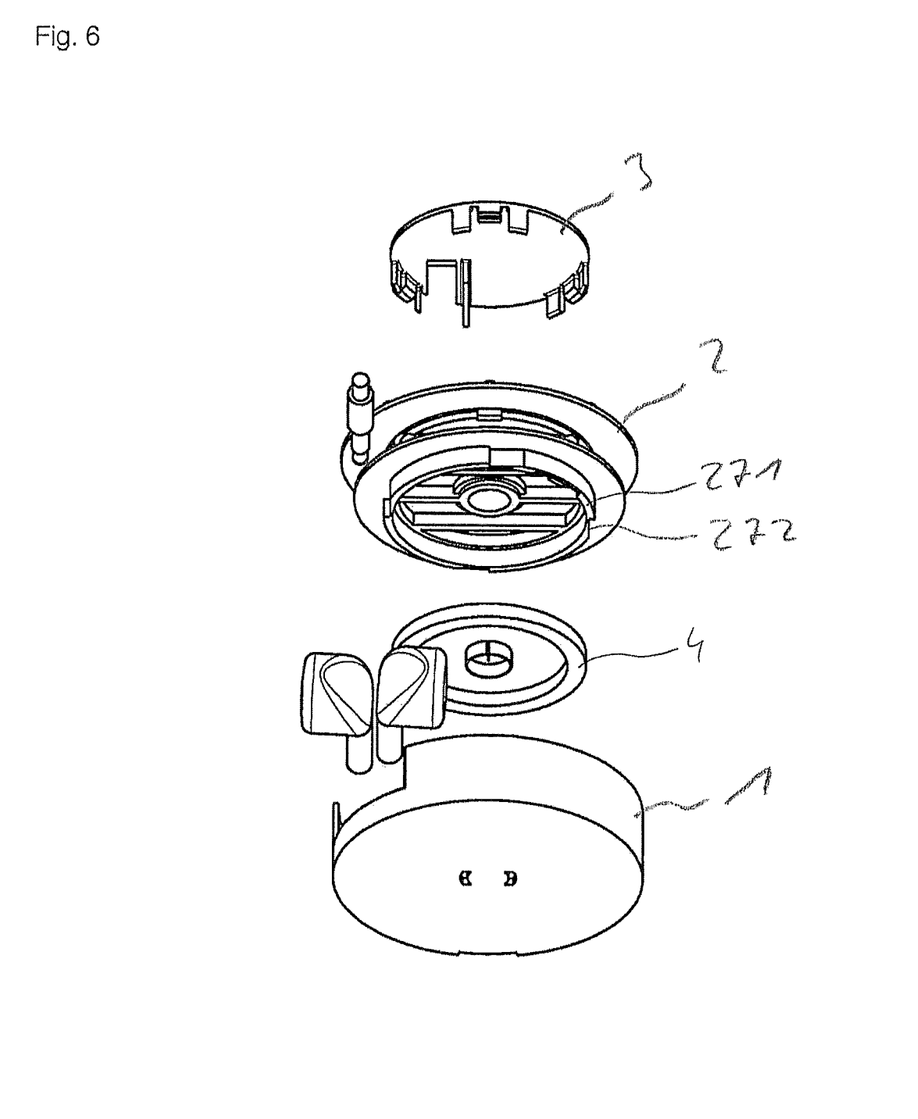
FIG. 6 the representation of the safekeeping apparatus from FIG. 4 in a further exploded representation.

In the exemplary embodiment according to FIG. 4, the accommodation apparatus is provided with a spring mechanism. In this connection, a helical spring is disposed between the winding spool 2 and the base plate 11 of the base body 1, and a locking lever 5 is disposed on the base plate 11 of the base body 1, to pivot on a lever axle 16 that is formed on there, in such a manner that its engagement projection 51 engages into engagement notches 272 introduced into the circumferential edge 271 of the lower disk 27 of the winding spool 2. In this connection, the engagement projection 51 is configured, in known manner, in such a manner that engagement takes place only during rotation of the winding spool 2 counter to the force of the helical spring 4.

Figure 7:
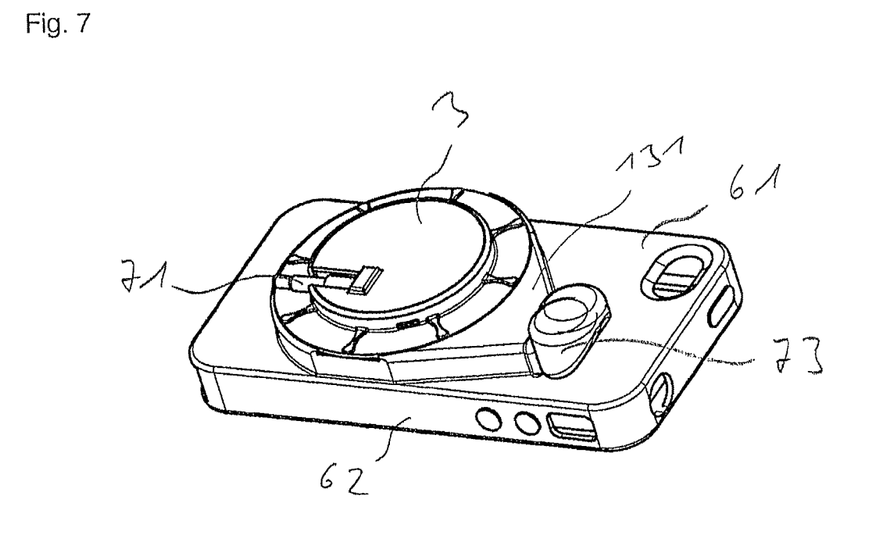
FIG. 7 the schematic, spatial representation of a safekeeping apparatus for an ear bud, with a formed-on protective cover for a smartphone.
Figure 8:
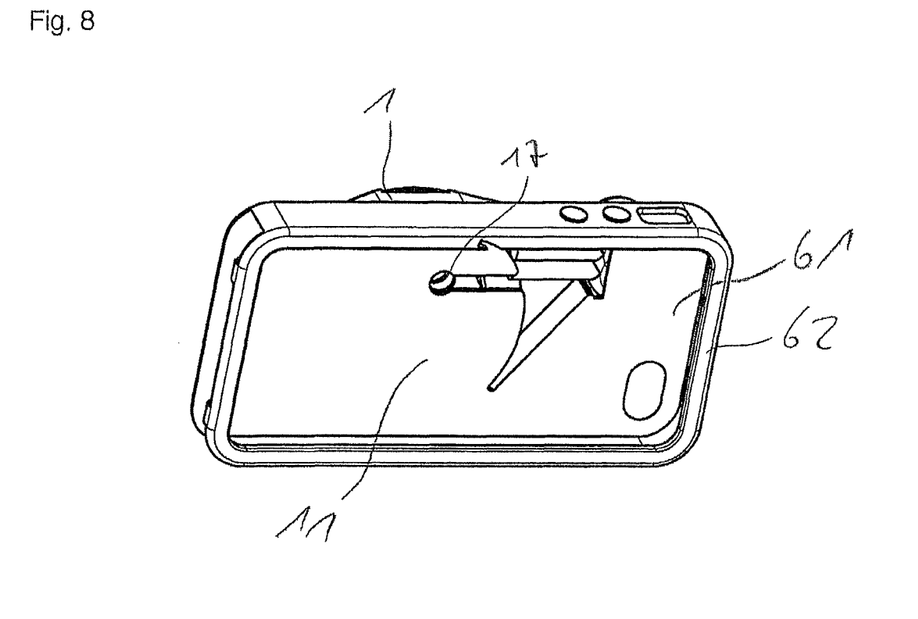
FIG. 8 the representation of the safekeeping apparatus from FIG. 7 in a view from below.
Figure 9:
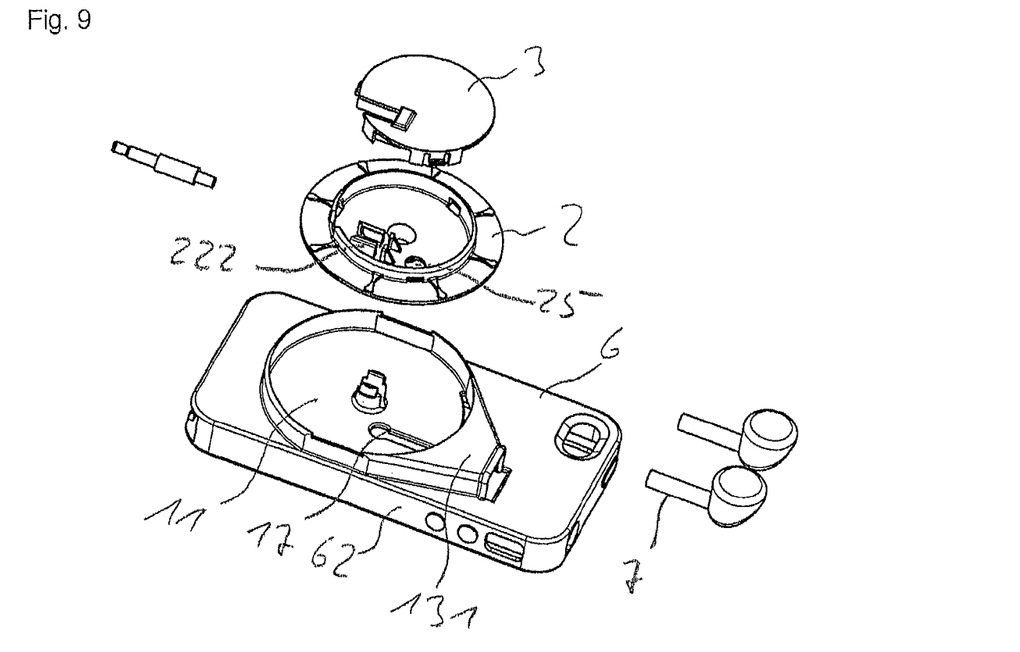
FIG. 9 the representation of the safekeeping apparatus from FIG. 7 in an exploded representation, with the ear bud indicated.
Figure 10:
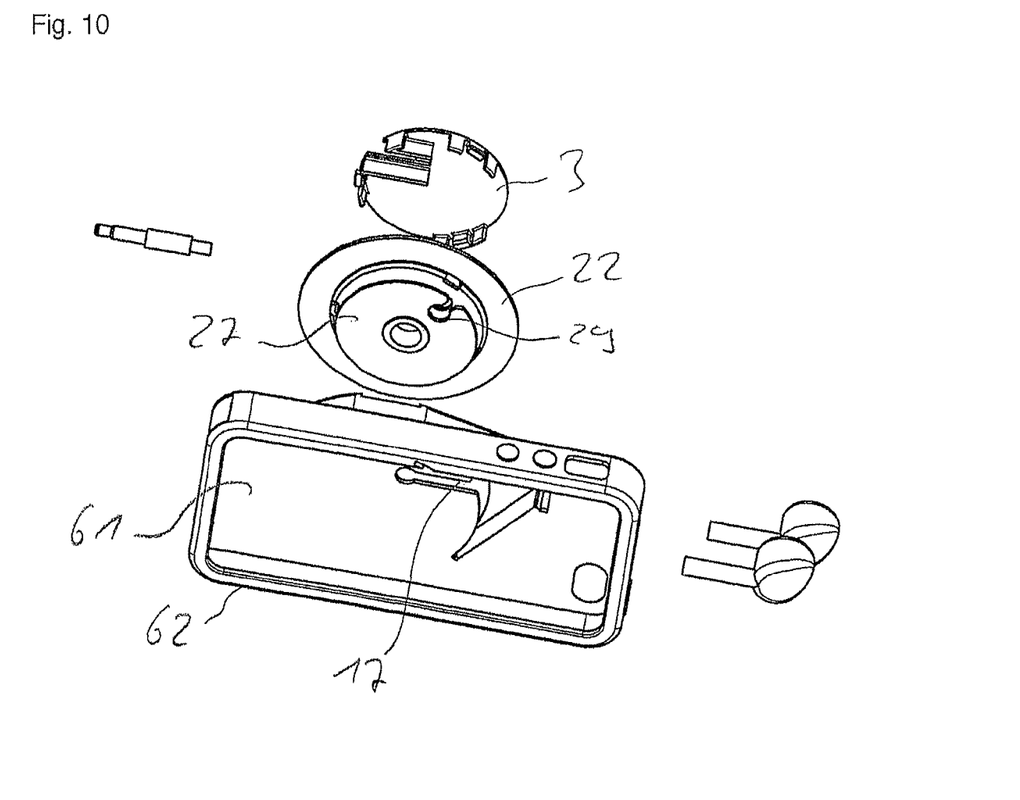
FIG. 10 the representation of the safekeeping apparatus from FIG. 7 in a further exploded representation.

In the exemplary embodiment according to FIG. 7, the base body 1 of the safekeeping apparatus is formed, in one piece, onto the back wall 61 of a protective cover 6 for a smartphone—not shown. In this connection, the outlet opening 13 of the base body 1 is formed by a funnel 131 that is formed on. In the exemplary embodiment, the back wall 61 as well as the base body 1 is structured as a one-piece injection-molded plastic part. The side walls 62 that enclose the smartphone—not shown—are formed from a flexible elastomer. In this embodiment, the base plate 11 of the base body 1 is in one piece with the back wall 61 of the protective cover 6. For introduction of the cable of an ear bud 7, in this exemplary embodiment, a pass-through 17 in the form of a bore is introduced into the base plate 11, which pass-through ends in a slit-shaped recess. The recess 25 of the upper disk 22 of the winding spool 2 is also formed, in this exemplary embodiment, by a bore, whereby a recess 29 that aligns with this recess 25 is introduced into the lower disk 27, which recess is also formed by a bore that corresponds to the bore of the upper disk 22, proceeding from which bore a slit is passed all the way to the outer edge of the lower disk 27. For introduction of the mini-plug 71 of an ear bud 7, the winding spool 2 is turned in such a manner that the recesses 25, 29 of the winding spool 2 align with the pass-through 17 of the base plate 11. Subsequently, the mini-plug 71 can be introduced into the accommodation space 24 of the upper disk 22 and fixed in place between the engagement arms 222.

Figure 11:
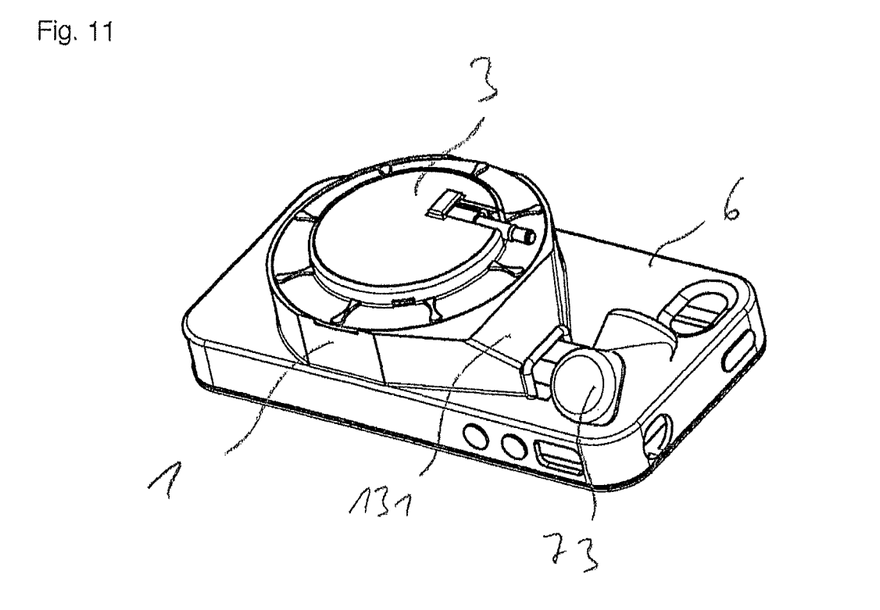
FIG. 11 the schematic, spatial representation of a safekeeping apparatus for an ear bud, with a formed-on protective cover for a smartphone, in a further embodiment.
Figure 12:
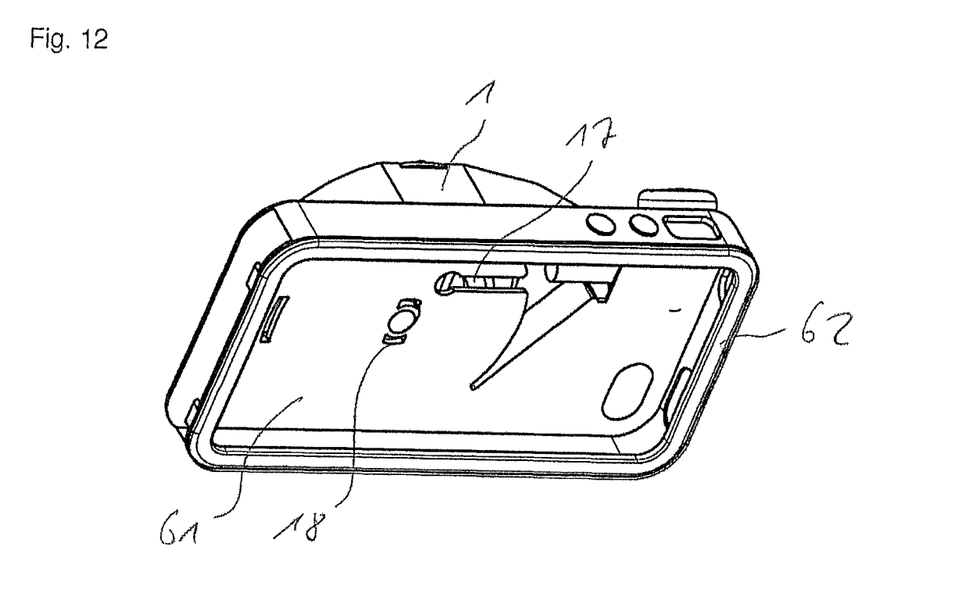
FIG. 12 the representation of the safekeeping apparatus from FIG. 11 in a view from below.
Figure 13:
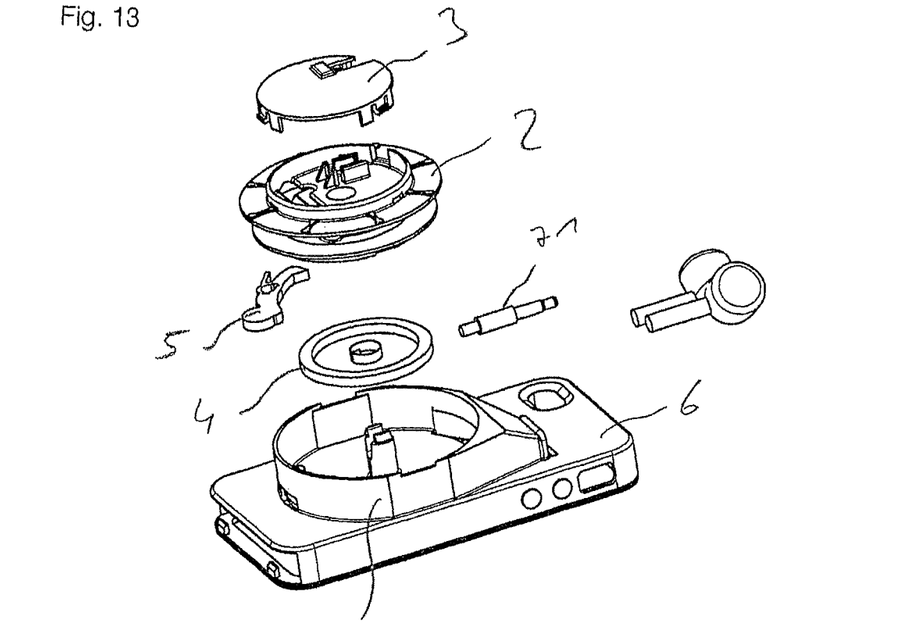
FIG. 13 the representation of the safekeeping apparatus from FIG. 11 in an exploded representation, with the ear bud indicated.
Figure 14:
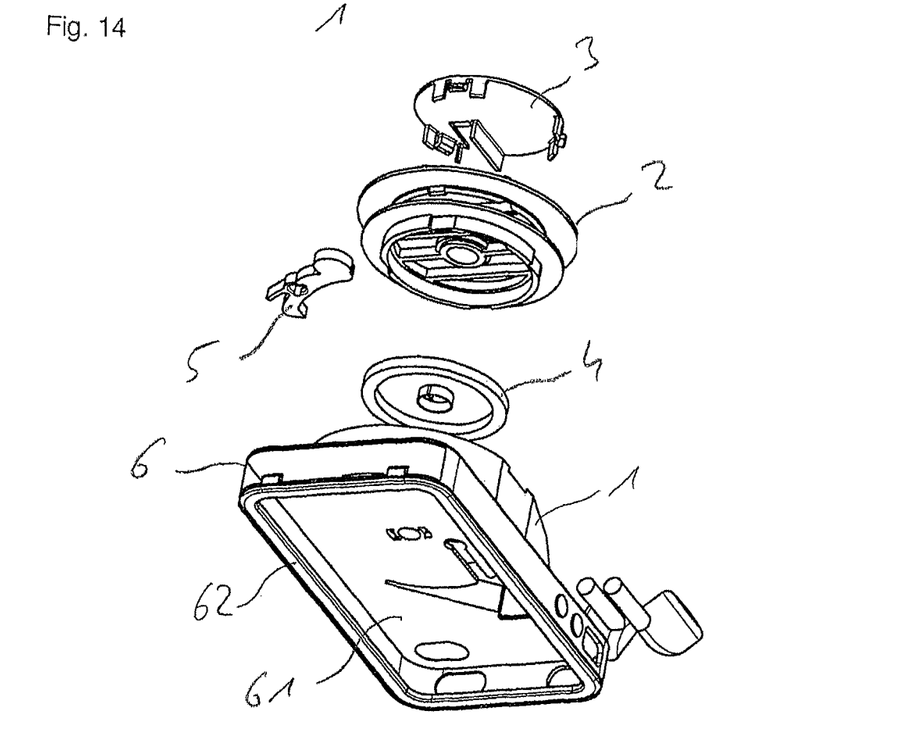
FIG. 14 the representation of the safekeeping apparatus from FIG. 11 in a further exploded representation.

In the exemplary embodiment according to FIG. 11, the safekeeping apparatus is provided, in the aforementioned manner, with a spring mechanism, whereby the helical spring 4 is fixed in place in two perforations 18 introduced into the base plate 11 concentric to the axle 14.

Figure 15:
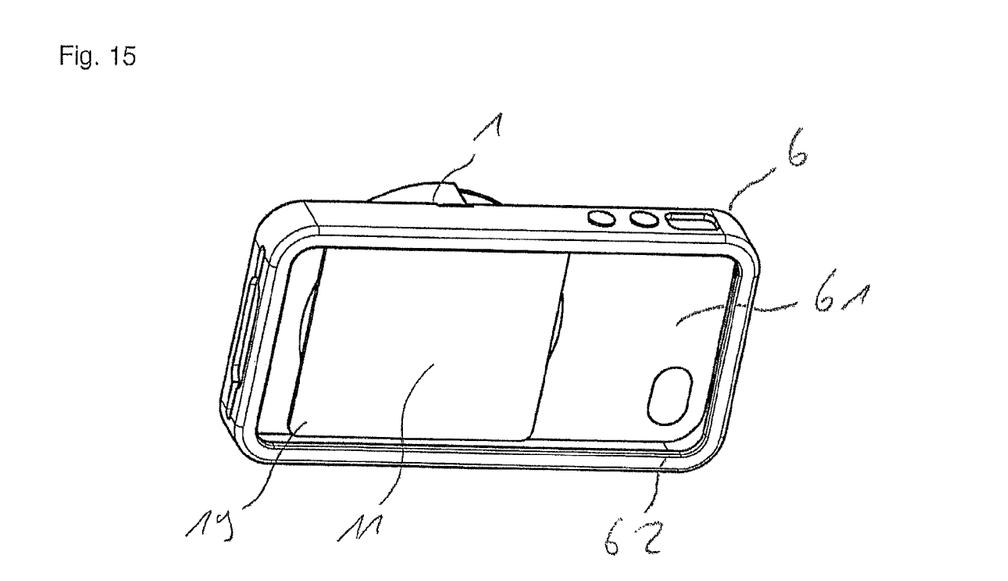
FIG. 15 the schematic, spatial representation of a safekeeping apparatus for an ear bud, releasably connected with a protective cover for a smartphone.
Figure 16:
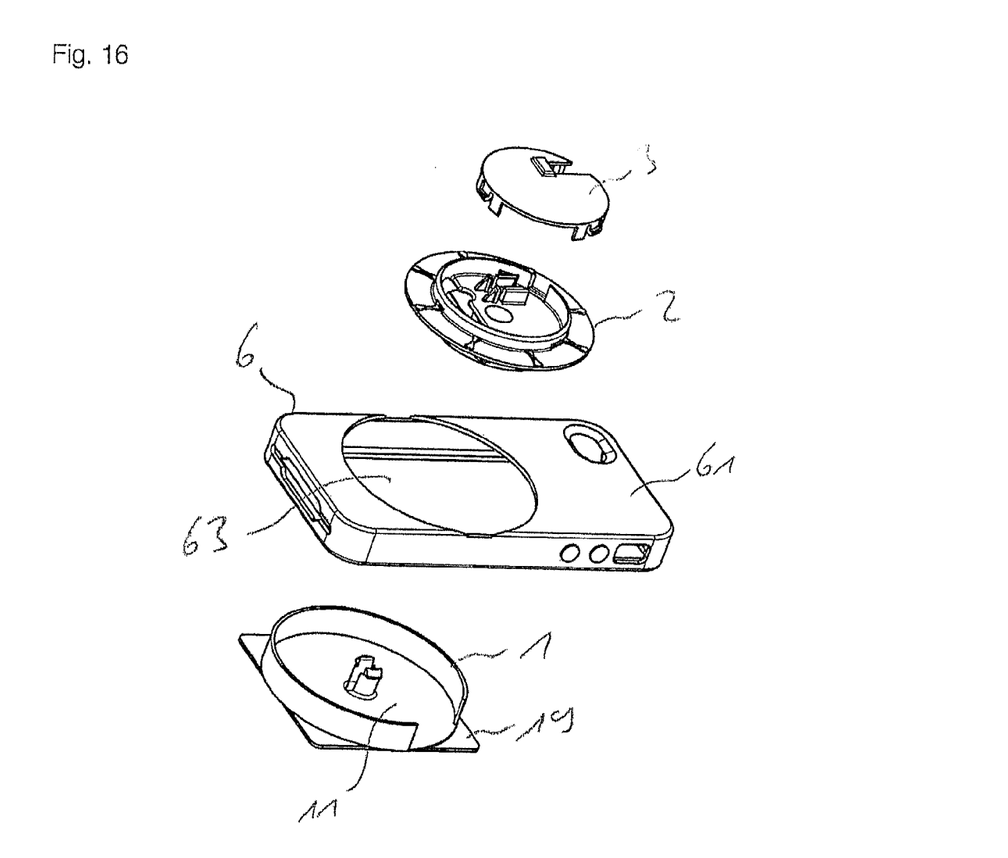
FIG. 16 the representation of the safekeeping apparatus from FIG. 15 in an exploded representation.

In the exemplary embodiment according to FIG. 15, the base plate 11 of the base body 1 is provided with four wings 19, disposed offset by 90°, so that a square base surface is formed. The base body is passed, with its outer wall 12, through a circular recess 63 of a protective cover 6, so that the wings 19 lie against the back wall 61 of the protective cover 6. Subsequently, the winding spool 2 is set onto the axle 14 of the base body 1, and the lid 3 is attached to the winding spool 2 in the manner described above. This releasable attachment of the safekeeping apparatus according to the invention on a protective cover 6 for accommodation of a smartphone offers the advantage that the apparatus can be positioned in different orientations, depending on the desired orientation of the mini-plug 71 or of the loudspeakers 73 of an accommodated ear bud 7.

Figure 17:
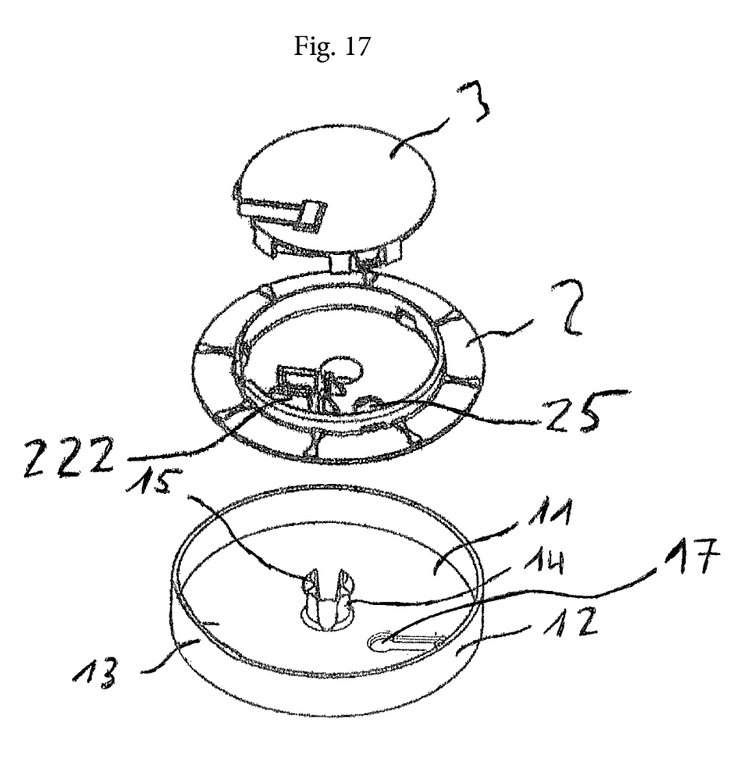
FIG. 17 the representation of a further embodiment which is not integrated into a smartphone and in an exploded representation.
Figure 18:
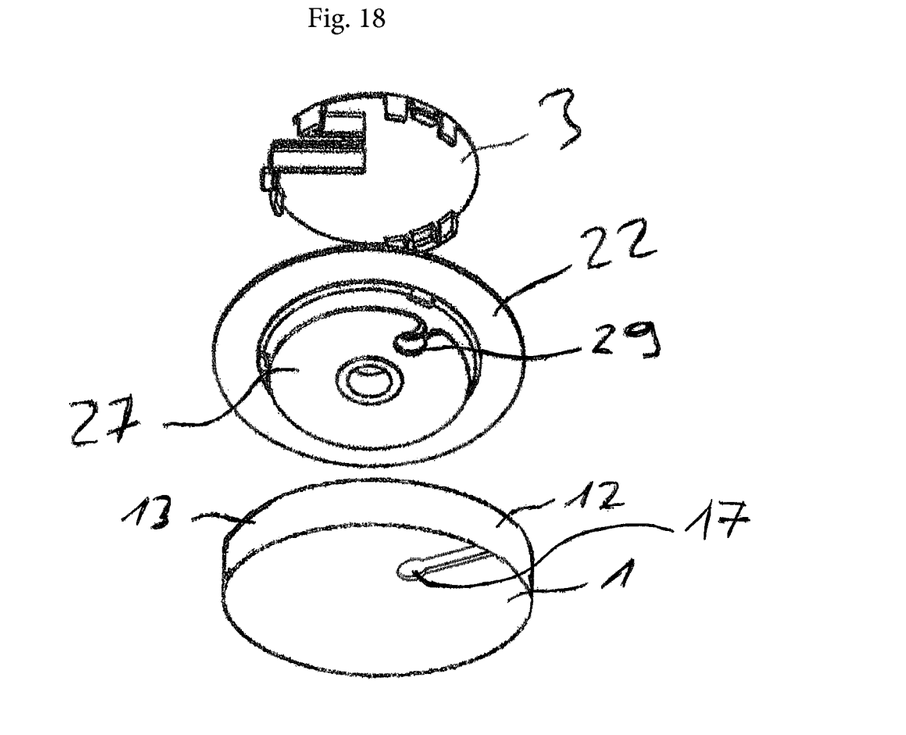
FIG. 18 the embodiment of FIG. 17 in a further exploded view.

FIGS. 17 and 18 show a further embodiment which is not integrated into the body of a smartphone. For introduction of the cable of an ear bud, in this exemplary embodiment, a pass-through 17 in the form of a bore is introduced into the base plate 11, which pass-through 17 ends in a slit-shaped recess. The recess 25 of the upper disk 22 of the winding spool 2 is also formed, in this exemplary embodiment, by a bore, whereby a recess 29 that aligns with this recess 25 is introduced into the lower disk 27, which recess 29 is also formed by a bore that corresponds to the bore of the upper disk 22, proceeding from which bore 29 a slit is passed all the way to the outer edge of the lower disk 27. For introduction of the mini-plug of an ear bud, the winding spool 2 is turned in such a manner that the recesses 25, 29 of the winding spool 2 align with the pass-through 17 of the base plate 11. Subsequently the mini-plug can be introduced into the accommodation space of the upper disk 22 and fixed in place between the engagement arms 222.

The object of the present invention is not restricted to safekeeping of headsets or ear buds. For example, it is also possible to keep the charging cable, which is also delivered with a smartphone, in such an apparatus.

The invention claimed is:

1. An apparatus for storing headphones or earplugs comprising a base plate having an axis adapted orthogonally to it, on which a winding spool is pivoted, wherein the winding spool has two parallel circular discs between which a winding space is formed, the two parallel circular discs comprising a lower disc and an upper disc, wherein in the upper disc arranged on the side facing away from the base plate, a recess for passing through a mini jack plug is arranged, wherein the upper disc has an upper side and a receptacle for said mini jack plug on said upper side, wherein the upper disc has a circumferential web on said upper side, which has an outlet for a cable and which delimits a reception space for said mini jack plug, and wherein the recess of the upper disc is formed via a groove extending between two opposite locations of the circumferential web for receipt of said mini jack plug, wherein below the recess a duct for said mini jack plug is arranged in the form of an indentation, said duct being formed in the lower disc and running parallel to the groove, is formed by a bore, wherein in the lower disc a lower disc recess aligned with said bore is placed, in a position of the winding spool the lower disc recess aligning with a feed-through placed in the base plate in a way that in this position of the winding spool said mini jack plug passed through said bore and through said lower disc recess is insertable into the reception space.

2. The apparatus according to claim 1, wherein the axis has latches at its free end and the winding spool is axially fixed to the axis via the latches.

3. The apparatus according to claim 1, wherein the base plate has an at least partially circumferential outer wall having an outlet and at least partially surrounding the circumference of the upper disc.

4. The apparatus according to claim 3, wherein the lower disc on the side facing base plate has a smaller outer diameter than the upper disc.

5. The apparatus according to claim 1, wherein on the upper disc on the upper side facing away from the lower disc a hollow, an elevation, or a hollow and an elevation are arranged for manually rotating the winding spool.

6. The apparatus according to claim 1, wherein the recess is formed by a bore, wherein in the lower disc a lower disc recess aligned with said bore is placed, wherein in a position of the winding spool the lower disc recess aligns with a feed-through placed in the base plate in a way that in this position of the winding spool said mini jack plug passed through said bore and through said lower disc recess is insertable into the reception space, wherein the lower disc recess as well as the feed-through of the base plate are formed respectively by a further bore corresponding to the recess of the upper disc, and wherein starting from the further bore a further groove is led from the outer edge of the lower disc or the base plate.

7. The apparatus according to claim 1, wherein on the upper side of the upper disc two parallel connectors for receiving said mini jack plug are arranged.

8. The apparatus according to claim 1, wherein the reception space delimited by the circumferential web is covered by a releasably secured lid.

9. The apparatus according to claim 8, wherein two parallel webs are arranged at the lid at the side facing connectors, which are mounted outside the connectors.

10. The apparatus according to claim 1, wherein the lower disc at the side facing base plate has a receptacle for a spring, and wherein a locking lever is arranged to base plate, via which winding spool is fixable in different rotating positions against the spring force of the spring.

11. The apparatus according to claim 10, wherein locking notches are formed circumferentially to the lower disc, which interact with said locking lever and via which the winding spool is fixable.

12. The apparatus according to claim 1, wherein the base plate is connected to the back panel of a smartphone or the back panel of a protective case of a smartphone.

13. The apparatus according to claim 12, wherein the base plate is formed to the smartphone or the protective case of a smartphone in a way that it simultaneously forms at least a part of the back panel of the smartphone or the protective case.

14. The apparatus according to claim 12, wherein the base plate is releasably attached to the smartphone or protective case.

15. The apparatus according to claim 14, wherein the base plate has a locking element, which is releasably locked to the locking element attached to the smartphone or protective case.

16. The apparatus according to claim 14, wherein at least one wing is formed to base plate, which is insertable in a receptacle arranged at the back panel of the smartphone or protective case.

* * * * *